United States Patent [19]

Wilson

[11] Patent Number: 5,571,019
[45] Date of Patent: Nov. 5, 1996

[54] APPARATUS AND METHOD FOR TEACHING CONCEPTS OF MATHEMATICS

[76] Inventor: Dallas R. Wilson, 2608 Fifth St., Slidell, La. 70458

[21] Appl. No.: 358,790

[22] Filed: Dec. 16, 1994

[51] Int. Cl.⁶ .................................................. G09B 19/00
[52] U.S. Cl. ........................ 434/207; 434/208; 434/209; 434/191
[58] Field of Search ................................... 434/207, 208, 434/209, 191, 188, 403, 113; 273/58 R, 58 K, 138 R, 429, 146

[56] References Cited

U.S. PATENT DOCUMENTS

| | | | |
|---|---|---|---|
| 890,259 | 6/1908 | Callanan | 273/138 R |
| 3,899,838 | 8/1975 | Lalley et al. | 273/146 X |

FOREIGN PATENT DOCUMENTS

| | | | |
|---|---|---|---|
| 2326217 | 4/1977 | France | 273/146 |
| 9004243 | 4/1990 | WIPO | 434/208 |

*Primary Examiner*—Gene Mancene
*Assistant Examiner*—Jeffrey A. Smith
*Attorney, Agent, or Firm*—Joseph T. Regard, Ltd.

[57] ABSTRACT

A system for teaching the basic concepts of mathematics utilizing a ball or the like having situated thereon certain mathematical problems and solutions, each such problem having framed thereabout certain colored geometric symbols, the symbols indicating certain commonalities in the problem. The ball of the present invention is to be utilized in organized or unorganized play, and is configured in such a manner as to relay to the user certain basic themes associated with mathematics, including (but not limited to) addition, subtraction, multiplication, and division. The preferred embodiment of the present invention teaches a generally spherical ball having multiple diverse geometric configurations, each like configuration having a common mathematical type of problem thereon, as well as a common color. In the preferred embodiment, the configurations could be situated randomly across the surface of the ball, or could be arranged along the longitudinal and/or latitudinal axis of the ball. In play, the user would, for example, bounce the ball, or otherwise cause randomized movement of the surface of the ball, catch or retrieve the ball, and lift the ball in to view, focusing on the geometric configuration within the nearest view of the user, and recite the problem to himself/herself; in the alternative, the user could recite the problem out loud to a playmate, withholding the answer so that the playmate can attempt to answer same. The geometric configurations could be raised on the ball to increase randomization during bouncing, while providing a tactile surface to stimulate the user.

9 Claims, 4 Drawing Sheets

APPARATUS AND METHOD FOR TEACHING CONCEPTS OF MATHEMATICS

TECHNICAL FIELD OF THE INVENTION

The present invention relates to educational methods utilizing learning aids, and in particular to a system for teaching the basic concepts of mathematics utilizing a ball or the like having situated thereon certain mathematical problems and solutions, each such problem having framed thereabout certain colored geometric symbols, the symbols indicating certain commonalities in the problem with other problems on the ball having the same symbol and/or color, to impart understanding of mathematics to the user.

The ball of the present invention is to be utilized in organized or unorganized play, and is configured in such a manner as to relay to the user certain basic themes associated with mathematics, including (but not limited to) addition, subtraction, multiplication, and division.

The preferred embodiment of the present invention teaches a generally spherical ball having multiple diverse geometric configurations, each like configuration having a common mathematical problem thereon, as well as a common color. In the preferred embodiment, the configurations could be situated randomly across the surface of the ball, or could be arranged along the longitudinal and/or latitudinal axis of the ball.

In play, the user would, for example, bounce the ball, or otherwise cause randomized movement of the surface of the ball, catch or retrieve the ball, and lift the ball in to view, focusing on the geometric configuration within the nearest view of the user, and recite the problem to himself/herself; in the alternative, the user could recite the problem out loud to a playmate, withholding the answer so that the playmate can attempt to answer same.

The geometric configurations could be raised on the ball to increase randomization during bouncing, while providing a tactile surface to stimulate the user.

BACKGROUND OF THE INVENTION

While the prior art has contemplated various and diverse teaching aids for facilitating learning of basic mathematics, some incorporating spherical devices, none are believed to teach or contemplate the present invention.

Patents which may be of interest regarding the present invention follow:

| Patent | Inventor | Issue Date |
| --- | --- | --- |
| 5,257,784 | Boylan et al. | 11/02/93 |
| 5,219,289 | | |
| 4,317,567 | Blake | 03/02/82 |
| 3,769,212 | Smith | 07/25/72 |
| 3,521,886 | Bosco | 07/28/70 |
| 3,464,698 | Bosco | 09/02/69 |
| 2,687,302 | Stiegler | |

U.S. Pat. No. 3,679,212 (now expired), teaching a "Chance Readout Educational Ball" teaches a ball having a plurality of spheres thereon, formed like our moon having craters, wherein each crater includes a window having a ball receiving means therein, and therein a numbered inner ball within the spherical main ball is configured to fall by chance within one of the window areas.

With '212, a multiplication or other problem is located by each aperture, such as, for example (7×_). The present system may be used to teach a math concept by rolling or shaking the ball, causing the inner number ball to fall into a random window; the user then reads the adjacent problem, inserting the inner number indicated through the window into the problem, and performing the problem, thereby providing a random problem generator for educational purposes. While this patent does not teach the geometric and problem commonalities associated with the searched for invention, it none the less is pertinent as disclosing a general concept for teaching math based upon randomness and problems generated via a ball.

U.S. Pat. No. 5,219,289 teaches a "Mathematical Teaching Aid", wherein there is provided a background grid having colored geometric shapes indicating commonalities of math problems associated therewith, to aid in the teaching of basic mathematical concepts, including multiplication, factoring composite numbers, squaring numbers, factoring quadratics, distinguishing between prime and composite numbers, and identifying factors to composite numbers.

The remaining cited patents teach various systems for facilitating learning of math, or systems for generating random numbers or the like, and are included for general information and reference.

Based upon the above, it is clear that the prior art has yet to contemplate a relatively easily fabricated, and uncomplicated system for facilitating learning of basic math concepts by children, for use in their everyday play and playground exercises.

GENERAL SUMMARY DISCUSSION OF THE INVENTION

Unlike the prior art, the present invention provides a fun, easily learned, effective and inexpensive way of teaching youngsters and the like basic math concepts.

The present invention as implemented may comprise a soft textured ball for young children, or may comprise, for example, a soccer ball, basketball, or kickball type ball, adapted to have the surface indicia as disclosed thereon.

In the exemplary embodiment of the present invention, basic addition, subtraction, multiplication and division problems are placed upon the surface of the ball, each of the problems framed by a specific geometric symbol, each symbol having a certain color background.

In this example, the augend, minuend, multiplicand, and dividend for each common number would share a common geometric frame and color background. Commonalities via geometric shapes and colors can be implemented, as an example, as follows.

For example, each problem having a number 1 commonly situated augend, minuend, multiplicand, or dividend would be placed, for example, in yellow squares.

Each problem having a number 2 commonly situated augend, minuend, multiplicand, or dividend would be placed, for example, in light burgundy octagons.

Each problem having a number 3 commonly situated augend, minuend, multiplicand, or dividend would be placed, for example, in purple stars.

Each problem having a number 4 commonly situated augend, minuend, multiplicand, or dividend would be placed, for example, in pink diamonds.

Each problem having a number 5 commonly situated augend, minuend, multiplicand, or dividend would be placed, for example, in red triangles.

Each problem having a number 6 commonly situated augend, minuend, multiplicand, or dividend would be placed, for example, in light blue circles.

Each problem having a number 7 commonly situated augend, minuend, multiplicand, or dividend would be placed, for example, in yellow right triangles.

Each problem having a number 8 commonly situated augend, minuend, multiplicand, or dividend would be placed, for example, in orange upside down equilateral triangles.

Each problem having a number 9 commonly situated augend, minuend, multiplicand, or dividend would be placed, for example, in green left triangles.

While the above example based the commonalities on the augend, minuend, multiplicand, or dividend, such commonalities could be equally based upon a common addend, subtrahend, multiplier, or divisor, or even a common answer, which would be in the form of a sum, difference, product, or quotient in the example utilizing addition, subtraction, multiplication, or division problems.

Another exemplary embodiment of the present invention contemplates utilizing a common geometric figure for indicating a commonality as above, but implimenting a common background color within but distinct from the border color of the framing geometric symbol, said background color to be utilized in conjunction with said geometric figures to indicate a commonality as to the mathematical operation such as, for example, addition, subtraction, multiplication, or division.

Linking the commonalities of numbers in various types of basic math problems has been found to stimulate interest in the user, engaging the user's curiosity to understand the differences relating to the various math problems and the similarities shared between same; linking this to a learning aid which allows the user to have playful fun while instilling math concepts is the object of the present invention.

It is thus an object of the present invention to provide a system for promoting an understanding of commonalities among basic mathematics concepts.

It is another object of the present invention to provide a system for teaching basic mathematics concepts which may be incorporated into recreational activities.

It is still another object of the present invention to provide a system which teaches basic understanding of commonalities among basic math concepts, utilizing selected geometric configurations and/or colors.

It is another object of the present invention to provide a system for teaching a basic understanding of commonalities among basic math concepts in the form of a ball which includes upon its outer surface math problems and answers thereon, said math problems individually distinguished to indicate a selected commonality among other problems thereon.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
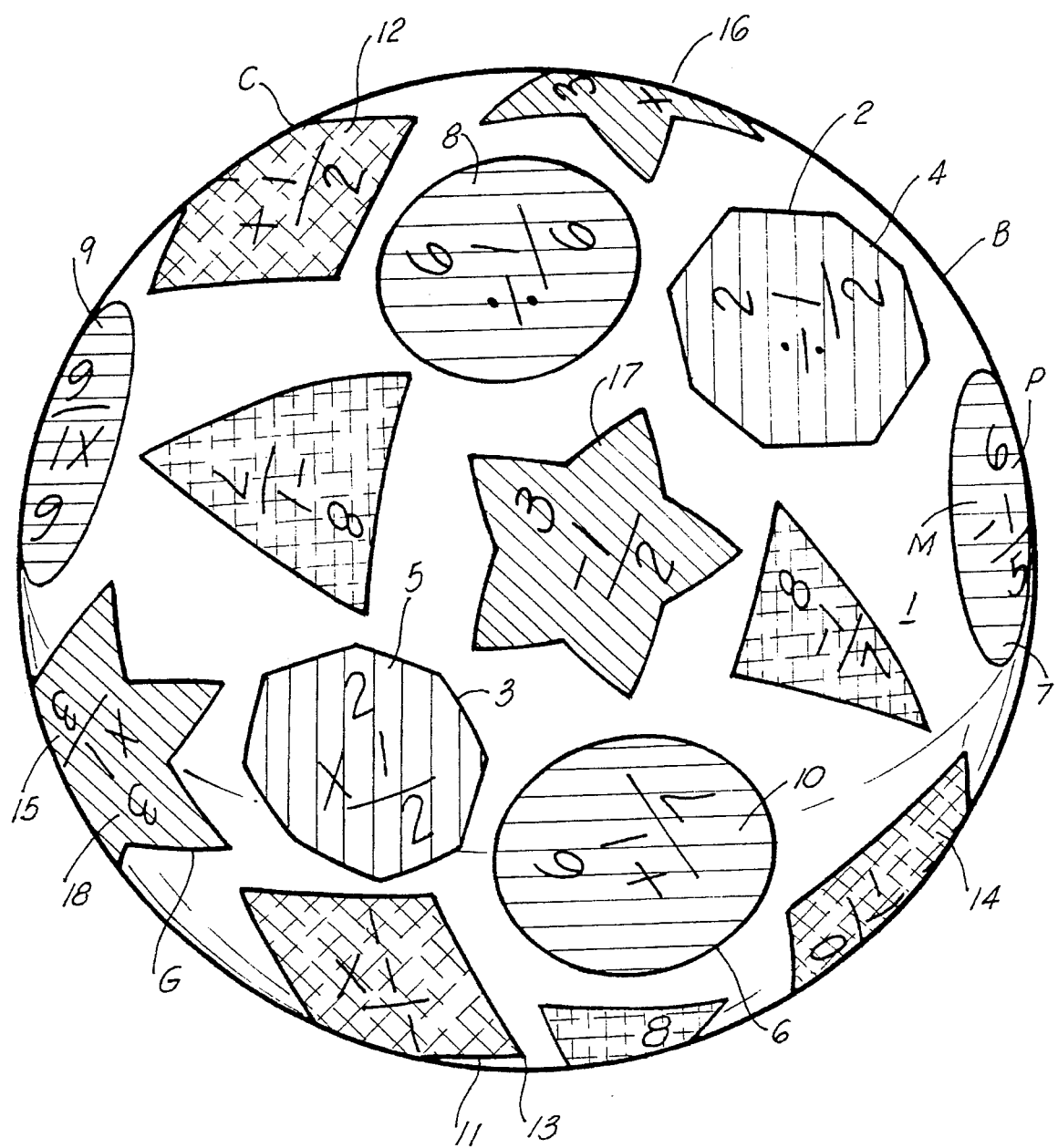
FIG. 1 illustrates a side view of the preferred embodiment of the mathematics ball of the present invention, illustrating a common first number used with various mathematical concepts.

Referring to FIG. 1 of the drawings, the preferred embodiment of the present invention comprises a ball B or the like having a plurality of spaced, diverse geometric shapes G formed thereon, said geometric shapes preferably having diverse colors C associated therewith as will be discussed further infra.

As further shown, situated within each one of the peripheries P of said geometric shapes is a single mathematical problem. Further, in the present embodiment, common geometric symbols share common field 1 within their respective borders 2.

In the present embodiment, common geometric shapes have situated therein diverse types of basic math problems M, with each said problem sharing a common first number.

For example, a octagon 3 is shown illustrating an addition problem having the a common number "2" as the first number, with octagon 4, a division problem. As further shown, the background color 5 of the octagons 3,4 is the same, further illustrating the commonality of said two problems. Not shown in this view are other octagons on the ball, which would have, for example, subtraction and multiplication problems having a common first number "2".

Circle 6 is shown illustrating an addition problem having the a common number "6"as the first number, with circle 7, a subtraction problem, circle 8, a division problem, and circle 9, a multiplication problem, all of said circles sharing a common background color 10.

Square 11 is shown illustrating a multiplication problem having a common number "1" as the first number, with square 12, an addition problem, and square 14, a subtraction problem, all sharing a common background color 13.

Star 15 is shown illustrating a multiplication problem having a common number "3"as the first number, with star 16, an addition problem, star 17, as subtraction problem, all sharing a common background color 18.

Figure 1A:
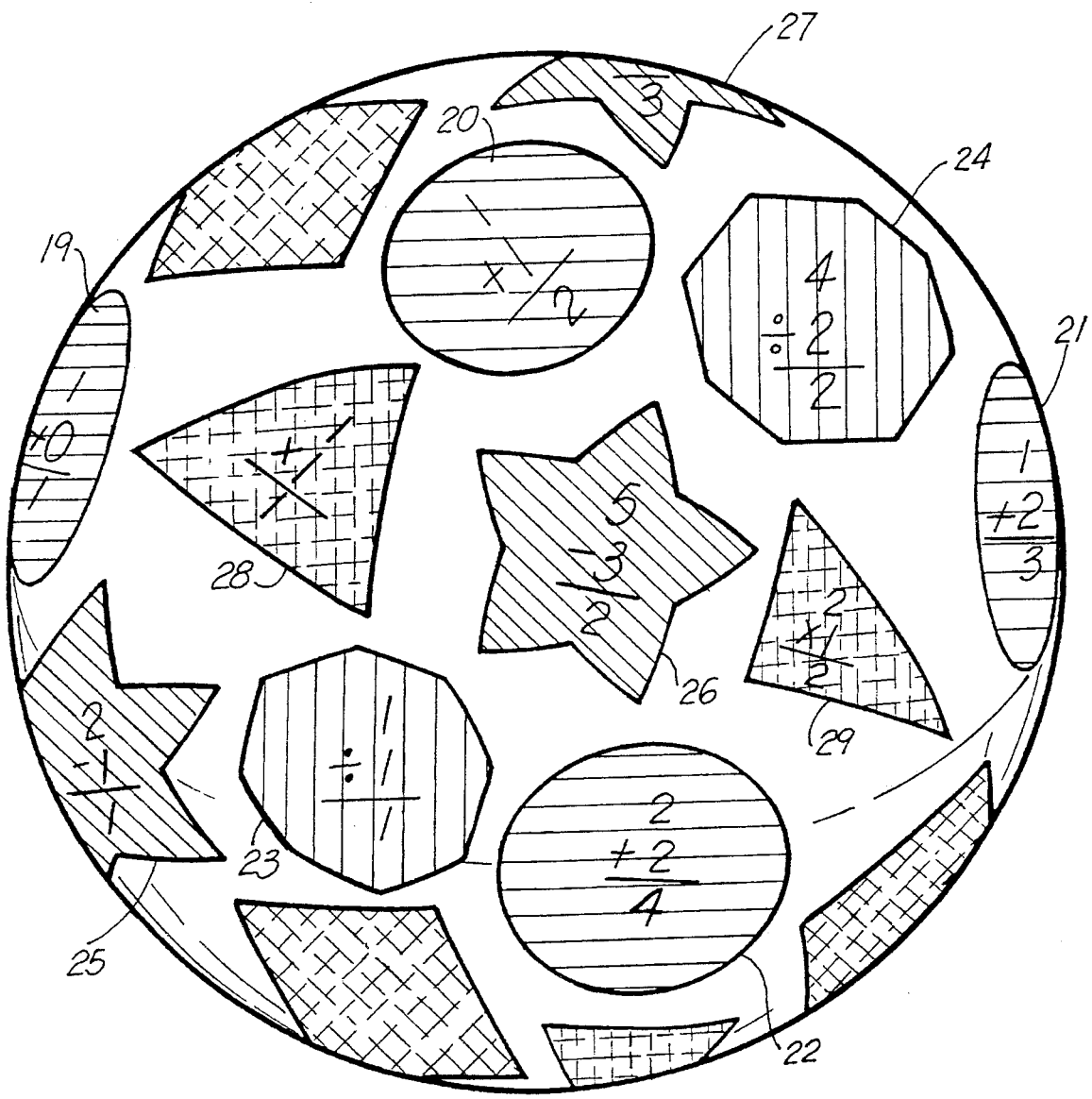
FIG. 1*a* illustrates an alternative view of the mathematics ball of the present invention, illustrating a commonality in the answer to various mathematics concepts.

Referring now to the alternative embodiment of FIG. 1*a* of the present invention, this embodiment contemplates a commonality in the form of common types of math problems, but with diverse, incrementally increasing answers which increase by a factor of "1".

For example, circles 19, 20, 21, 22 all illustrate basic math problems having answers increasing by a factor of one, the respective answers being "1", "2", "3", and "4".

Octagons 23, 24 illustrate division problems having incrementally increasing answers "1" and "2".

Stars 25, 26, 27 illustrate subtraction problems having answers incrementally increasing by one.

Likewise triangles 28, 29 illustrate multiplication problems having answers increasing by one incrementally.

Figure 1B:
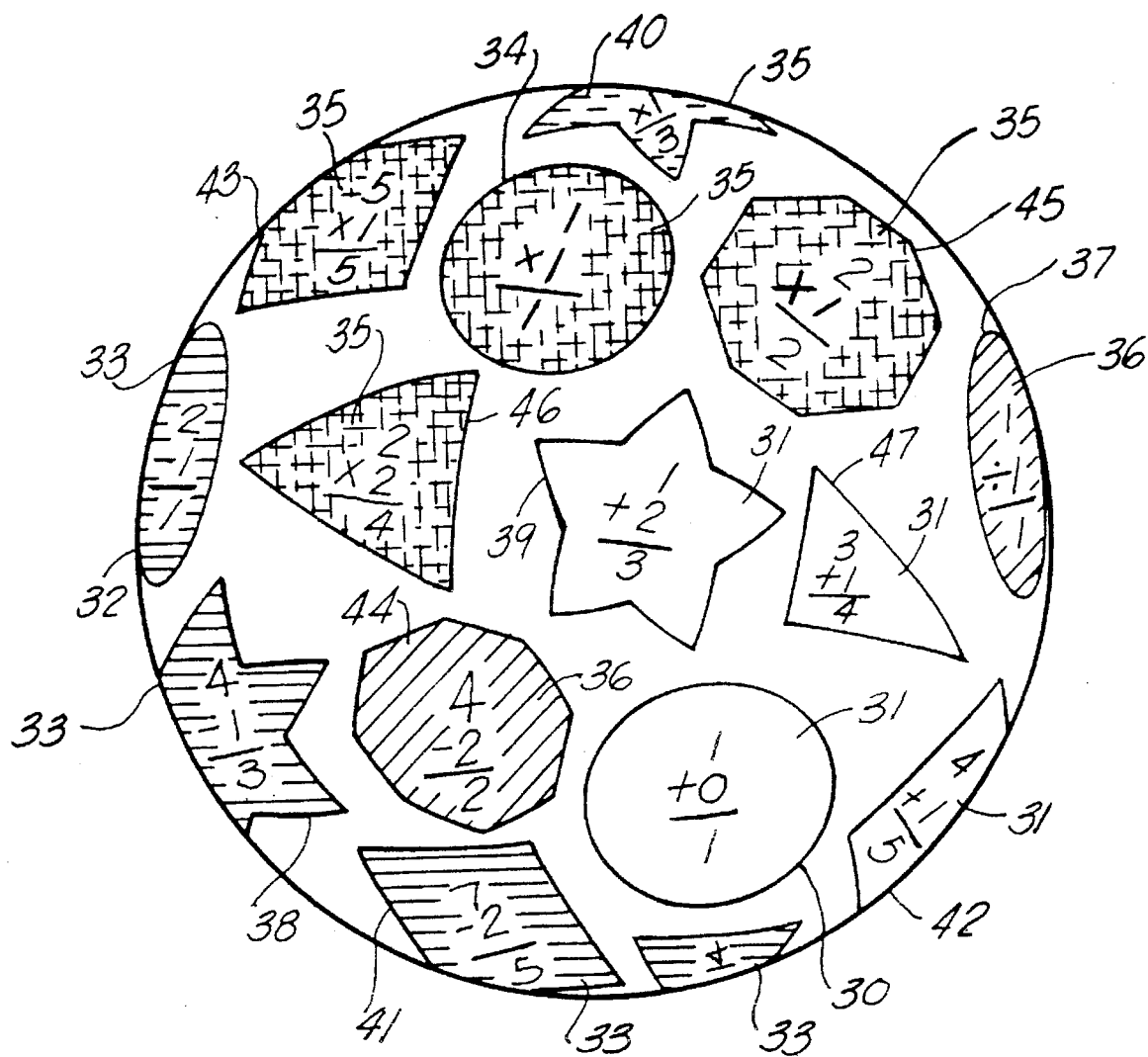
FIG. 1*b* illustrates a second alternative view of the mathematics ball of the present invention, illustrating a progression in the answer in counting sequence.

Referring now to the alternative embodiment of FIG. 1b of the present invention, this embodiment contemplates a commonality in the form of various types of problems having a common answer, the problems and answer framed by a common geometric symbol. Each of the various answers in this exemplary embodiment constitute basic, single digit, counting numbers, incrementally increasing by a factor of one, from numbers "1" to "5".

Further, this embodiment illustrates a specific background color shade exemplifying a certain type of problem.

For example, circles 30, 32, 34, 37 frame problems having "1" as the answer, circle 30 illustrating an addition problem, circle 32 illustrating a subtraction problem, circle 34 illustrating a multiplication problem, and circle 37 illustrating an addition problem.

Octagons 44, 45 are shown illustrating division and multiplication problems, respectively, having as their answers "2".

Stars 38, 39, 40 are shown illustrating problems having "3" as their answers, the stars illustrating subtraction, addition, and multiplication problems, respectively, having as their answers "3".

Right triangles 46, 47 are shown illustrating problems having "4" as their answer, illustrating multiplication and addition problems, respectively.

Squares 41, 42, 43 are shown illustrating problems having "5" as their answers, the squares illustrating subtraction, addition, and multiplication problems, respectively, having as their answers "5".

The above geometric configurations further include background colors within the perimeters of said configurations, said colors symbolizing the particular type of problem embodied therein.

As shown, a white color 31 may be employed to symbolize addition problems, for example; this illustrates problems framed by diverse geometric shapes 30, 42, 39, and 47, constituting a circle, square, star, and right triangle, respectively.

Likewise, shaded area 33 symbolizes the color blue, for example, illustrates subtraction problems, while shaded area 35 symbolizes the color yellow, for example, illustrating multiplication problems, for example.

Similarly, shaded area 36 may symbolize the color tan, for example, and illustrate division problems, for example.

Figure 3:
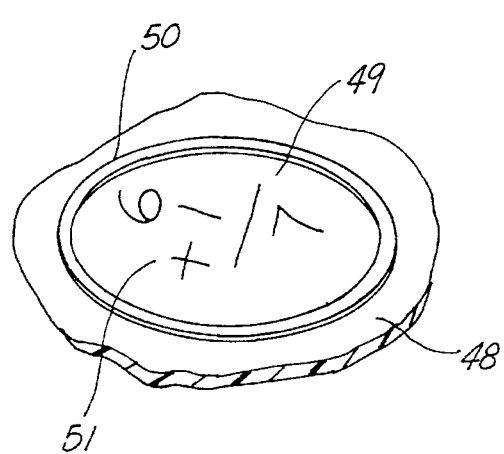
FIG. 3 illustrates a generally isometric, partial, cut-away view of an alternative embodiment of the invention of FIG. 1, illustrating a raised geometric border surrounding an exemplary math problem.
Figure 4:
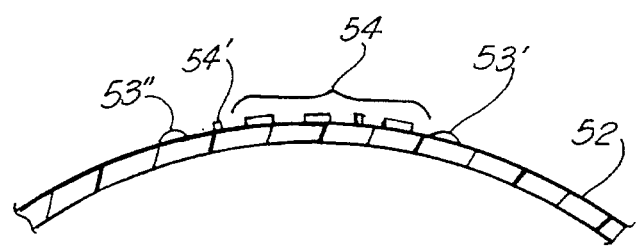
FIG. 4 illustrates a generally cross-sectional, partial view of an alternative embodiment of the invention of FIG. 1, illustrating a raised geometric border surrounding an exemplary math problem.

FIGS. 3 and 4 illustrate the utilization of raised surfaces to provide a tactile feel to the system, which has been found to allow children to better interface with intangible concepts such as math or the like, as it allows them to "feel" the problems and identifying borders.

As shown in the exemplary embodiment of FIG. 3, a from the surface 48 of the ball, symbolizing the geometric symbol 49 frames a problem and background color 51.

FIG. 4 illustrates still another alternative embodiment of the present invention, wherein there is provided on the ball 52 a raised border a raised periphery 53', 53" denoting a geometric symbol, framing a raised problem 54 and raised color symbol 54', denoting the background color. Such raised color symbols could comprise, for example, raised dots or other symbols to denote the above disclosed background colors.

The embodiment of FIG. 4 is particularly suitable for handicapped children who may be visually impaired, and who may not be able to see the colors and/or numerals and symbols.

Figure 2:
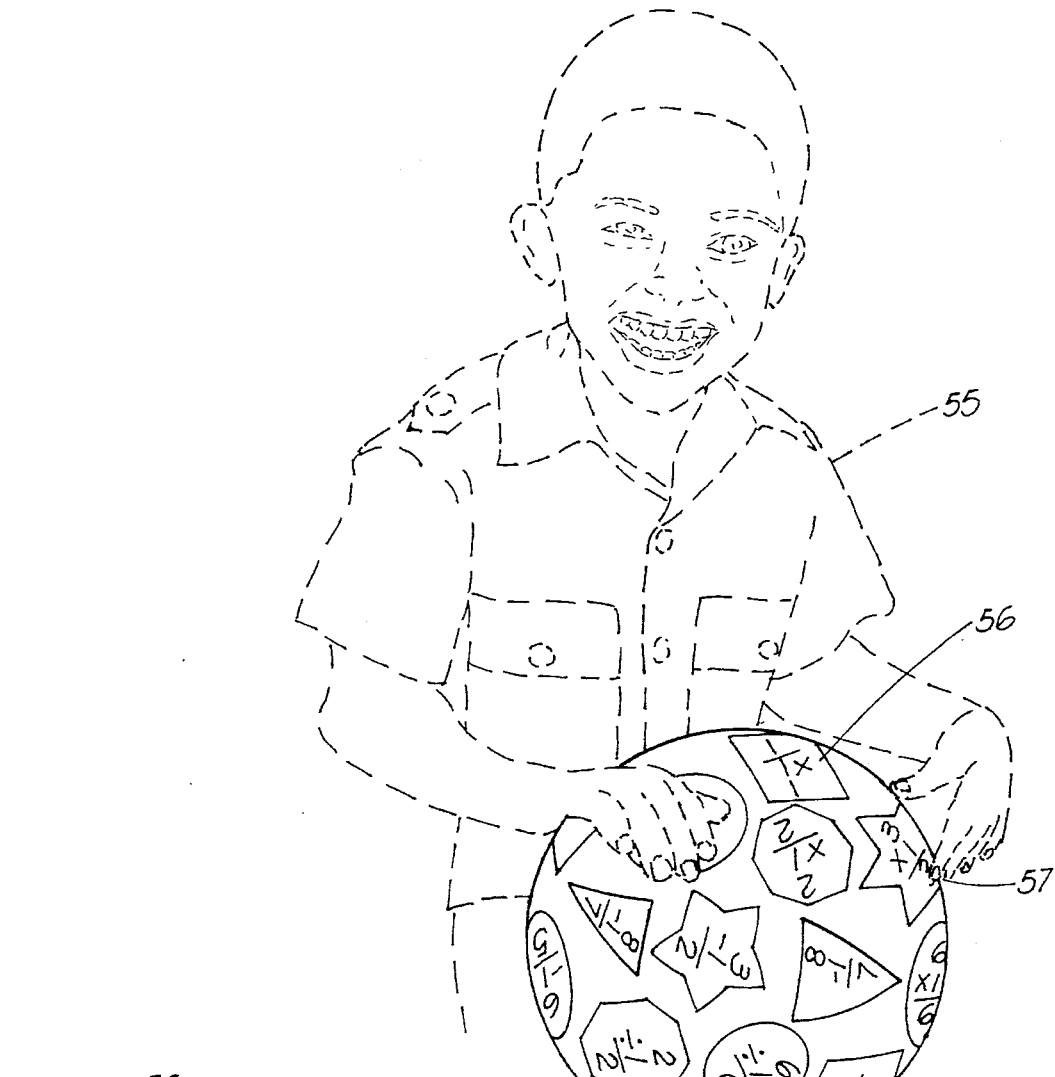
FIG. 2 illustrates an isometric view of the preferred embodiment of the invention of FIG. 1, in use by a child.

FIG. 2 illustrates an exemplary utilization of the ball of the present invention in the system for understanding and learning basic math concepts. As shown, a user 55 may engage in play with the ball by bouncing, tossing it to another, or engage in other use of the ball wherein the surface is randomly moved about. During periodic intervals, upon coming into contact with the ball, the user 55 grasps 57 the ball 58 and views the problem 56 within the nearest field of view, reciting the problem either to himself or out load, and noting the framing geometric symbol and background color, and thereafter considering other problems on the surface of said ball and discerning the commonalities associated with the various problems, based upon the geometric symbol and/or background color. Also, the party in possession of the ball can quiz a playmate during play with the ball, inquiring as to the answer, and perhaps quiz as to the appropriate background color as well as the appropriate framing geometric symbol. The ball can be utilized in these activities in conjunction with traditional ball games, including toss, kickball, and similar activities.

The embodiment illustrating raised peripheries, as shown in FIGS. 3 and 4, may further enhance the random movement of the surface during play, as well as allowing participation in such games by visually impaired users.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. An apparatus for teaching basic concepts of mathematics, comprising:

a ball having a generally radial surface having situated thereon a field of diverse, basic mathematical problems of different types and solutions, each problem in said field having framed thereabout a specific geometric symbol selected from a diverse group of symbols, said symbols indicating discernable commonalities in each of said problems relative to the remaining problems in said field.

2. The apparatus of claim 1, wherein there is further provided within said each of said geometric symbols a background color selected from a field of background colors, said background color indicating other commonalities in each of said problems relative to the remaining problems in said field, said other commonalities different than those commonalities illustrated by said geometric symbols.

3. The apparatus of claim 2 wherein each of said geometric symbols is raised from the surface of said ball, providing a tactile feel to said ball.

4. The apparatus of claim 3, wherein each of said problems is raised from the surface of said ball, providing a tactile feel to said ball, and allowing the user to identify the problem without visually viewing same.

5. The apparatus of claim 4, wherein there is further provided color symbols raised from the surface of said ball, within the perimeter of said geometric symbols, illustrating the background color framed therein.

6. The apparatus of claim 1, wherein said diverse group of said symbols is on said ball.

7. A method for teaching basic concepts of mathematics to a user, comprising the steps of:

a) providing a ball having a surface having situated thereon a field of diverse, basic mathematical problems of different types and solutions, each problem in said field having framed thereabout a specific geometric symbol selected from a group of symbols, said symbols indicating discernable commonalities in each of said problems relative to the remaining problems in said field, said ball further having provided within said each of said geometric symbols a background color selected from a field of background colors, said background color indicating other commonalities in each of said problems relative to the remaining problems in said field, said other commonalities different than those commonalities illustrated by said geometric symbols;

b) engaging in play with said ball in such a manner that said surface of said ball is randomly moved about;

c) at periodic intervals, upon coming into contact with the ball, grasping the ball and viewing the problem within the nearest field of view of the user;

d) reciting said viewed problem, and noting the framing geometric symbol and background color;

e) considering other problems on the surface of said ball and discerning the commonalities associated with the various problems, based upon the geometric symbol and/or background color.

8. The method of claim 7 wherein there is further included the step of providing the user with a playmate, and after step "e", the user, while grasping the ball, quizzing said playmate by reading out loud said viewed problem, inquiring as to the answer.

9. The method of claim 8, wherein there is further included the step of the user further quizzing the playmate, after having read the viewed problem in full out loud, as to the appropriate background color of said problem, the correct answer based upon the established colors upon said ball, as well as the appropriate framing geometric symbol, the correct answer based upon the established geometric symbols on said ball.

\* \* \* \* \*